Aug. 15, 1933.          H. A. DOUGLAS          1,922,236
SWITCHING MECHANISM
Filed Feb. 6, 1932          2 Sheets-Sheet 1
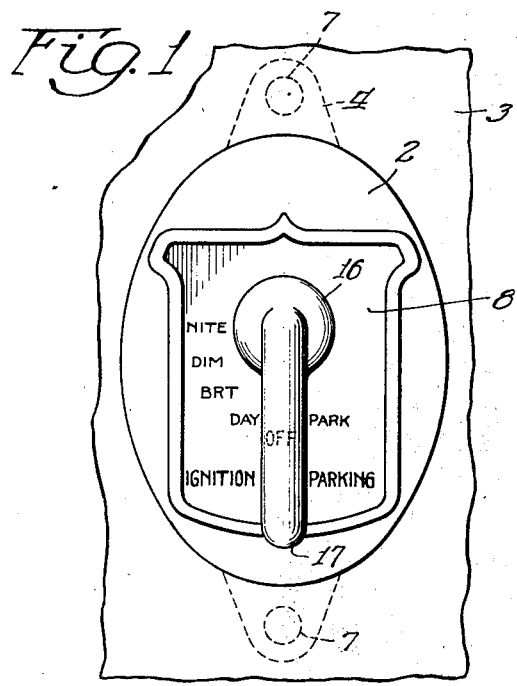
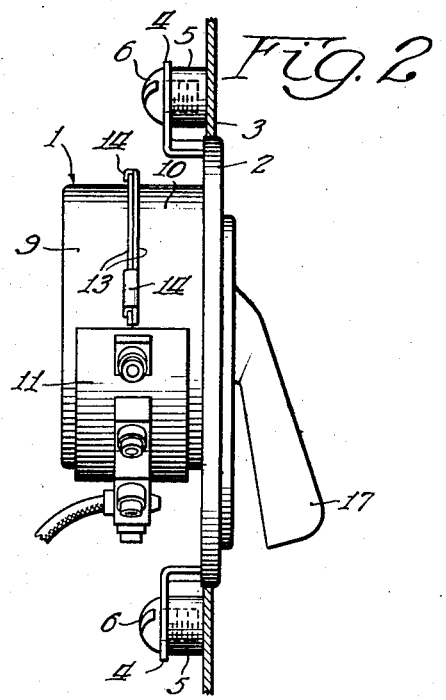
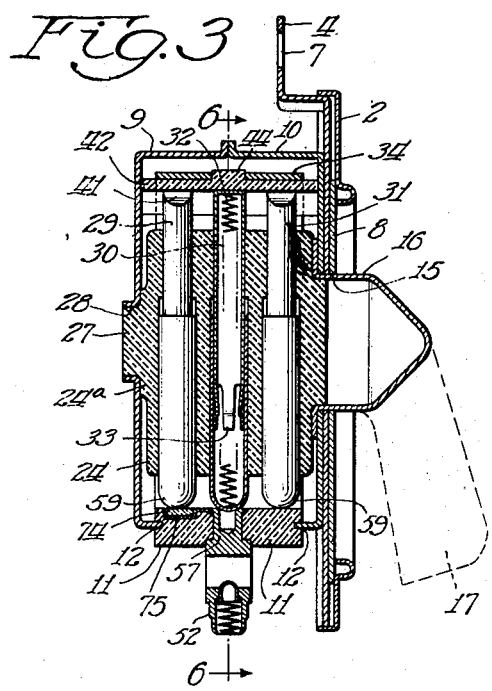
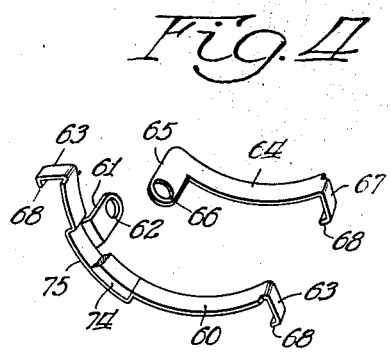
Inventor
Harry A. Douglas
By Lawson Moon
Atty.

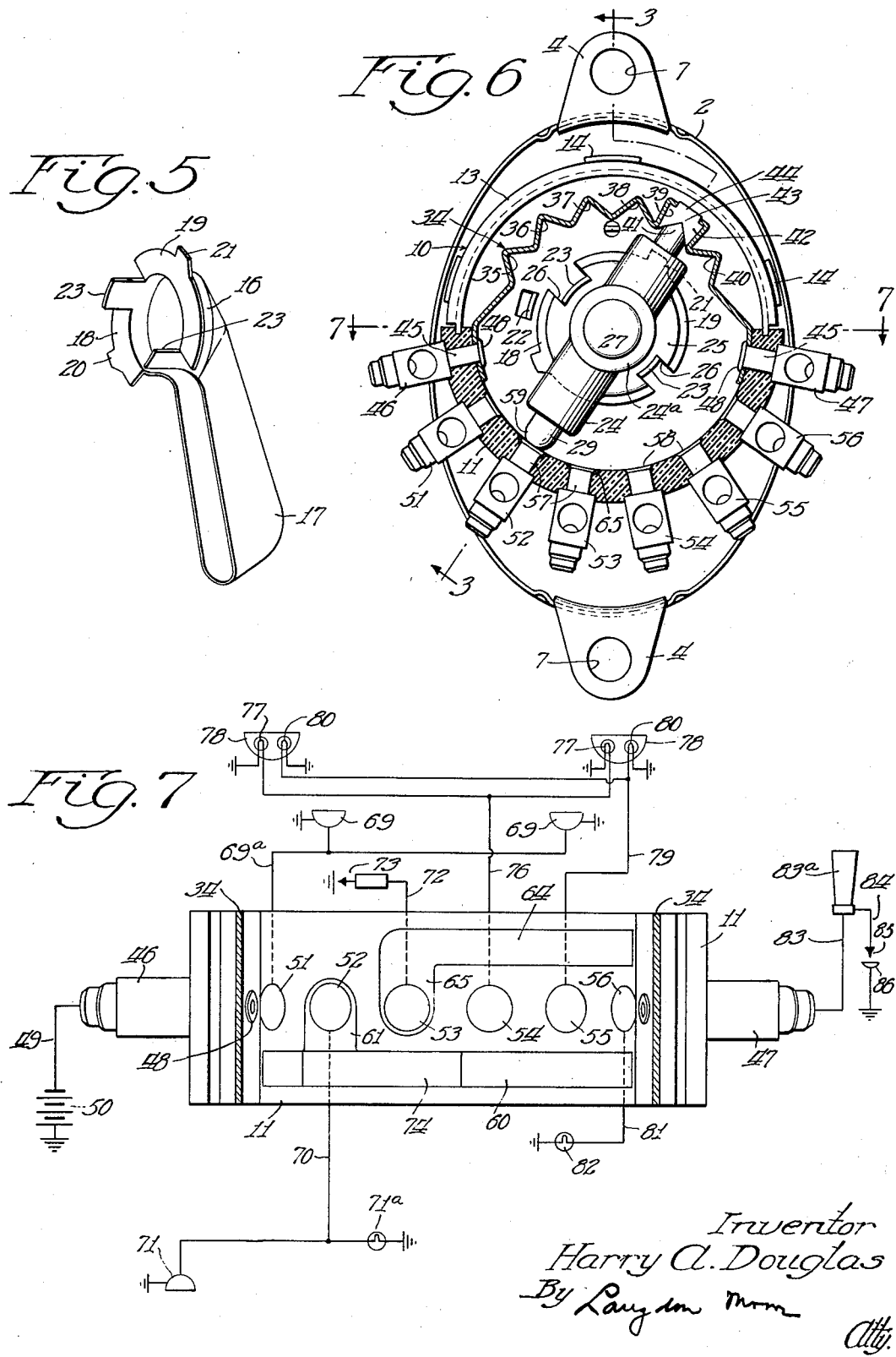

Patented Aug. 15, 1933

1,922,236

UNITED STATES PATENT OFFICE 1,922,236

SWITCHING MECHANISM

Harry A. Douglas, Bronson, Mich.

Application February 6, 1932. Serial No. 591,261

8 Claims. (Cl. 200—8)

This invention relates to switching mechanism more particularly for automotive vehicles and electrical circuits associated therewith.

The invention is of particular utility in connection with switching mechanism which is mounted upon the instrument panel of the vehicle.

Among other objects, the invention provides a simple and efficient horn connection associated with the type of switching mechanism disclosed.

Another object of the invention is to provide actuating means for the movable contacts of the mechanism, which means is desirably integral with the operating lever therefor.

The invention will be more fully explained by reference to the illustrative construction shown in the accompanying drawings in which—

Figure 1 is a front view of a portion of an instrument panel with the invention applied thereto;

Figure 2 is a side elevation of the structure of Figure 1, the panel being shown in section;

Figure 3 is a section, somewhat enlarged, taken on the line 3—3 of Figure 6;

Figure 4 is a perspective view of parts of the structure of the foregoing figures shown in separated relation;

Figure 5 is a perspective view of the preferred form of integral actuating means and operating lever;

Figure 6 is a section taken on the line 6—6 of Figure 3, but showing the contact carrier in end elevation; and Figure 7 is an enlarged section taken on the line 7—7 of Figure 6 and showing diagrammatically illustrative circuits associated therewith.

The switching mechanism illustrated is generally enclosed in the conventional cylindrical casing 1 which is appropriately secured to a supporting bracket 2 which may be of oval configuration and be received in a corresponding aperture in the instrument panel 3. Integral ears 4 offset from the bracket may conveniently register with bosses 5 on the rear face of the panel and screws 6 may be passed through holes 7 in the ears 4 and be threadedly received in the bosses 5 to support the bracket 2 and casing 1 upon the instrument panel. The bracket 2 is desirably provided with a legend plate 8 facing forwardly of the instrument panel and carrying appropriate legends indicating the respective operative positions of the switching mechanism as indicated in Figure 1.

The switch casing 1 is desirably formed of two mating cup-shaped sections 9 and 10, these sections having clamped between them a semi-cylindrical insulating wall member 11 which forms a portion of the wall of the casing 1. The member 11 may be secured by having edges of the sections 9 and 10 received in grooves in the edges of the member 11 as best shown at 12, 12 (Figure 3). The sections 9 and 10 may be themselves clamped together by having laterally disposed mating flanges 13 and segmental ears 14 on one of the flanges 13 crimped over the other flange 13.

The forward section of the casing 1, in this instance the section 10, is provided with a central aperture which registers with similar apertures in the bracket 2 and plate 8 in which apertures, as at 15, is journalled the hub 16 of an operating lever 17 for the switching mechanism. The lever 17 is directed radially of the hub 16 and is accessible upon the outer or forward face of the instrument panel for hand operation. Upon its inner end the hub 16 has the integral segmental laterally directed flanges 18 and 19 which limit the movement of the hub 16 forwardly of the casing 1 and provide a bearing for the hub on the inner wall of the casing. Extended portions on each of the flanges 18 and 19 provide fingers 20 and 21 which, by engaging a stop 22 formed by being struck inwardly from the front wall of the casing 1, limit the rotative movement of the hub 16. The hub 16 at its inner end also has other axially extending fingers 23 which are desirably formed integrally with the hub and diametrically disposed on the hub between the flanges 18 and 19. The hub 16 and fingers 23 constitute an actuator for a rotatable contact carrier carried within the casing 1. In accordance with my invention the operating lever 17, hub 16, flanges 18 and 19, fingers 21 and 22 and fingers 23 are formed integrally and desirably of a pressed metal. The integral operating lever and actuator thus formed may be assembled with the casing 1 and bracket 2 by having the handle 17 passed through the apertures 15 from the rear of the casing section 10 and then manipulated into position with the flanges 18 and 19 bearing against the inner surface of the front wall of the casing section 10.

As here shown, the contact carrier 24 formed of a generally oblong block of insulating material is provided upon one side with an enlarged hub portion 25 which has the diametrically disposed slots 26 snugly receiving the fingers 23 of the hub 16. One each of these fingers and slots is desirably larger than the other so that the carrier 24 can be assembled in but one rotative position with respect to the actuator provided by the hub 16 and fingers 23. Upon its side opposite the hub portion 25 the carrier 24 is provided with another hub portion 24a which has a reduced continuation 27 journaled in the centrally disposed flanged aperture 28 at the rear of the casing 1. So constructed and arranged the contact carrier 24 may be rotated within the casing 1 by rotation of the operating lever 17 and the carrier 24 is disposed in a plane extending along the axis of the hub 16 and passing through said axis.

The contact carrier 24 is shown bored in the direction of its greatest width to receive a metallic contact member to be spring pressed radially of the axis of rotation of the carrier. In the illustrative construction, the carrier is provided with a sufficient number of such bores to receive three metallic contact members 29, 30 and 31 (Figure 3) arranged parallel in a plane extending along the axis of the hub 16 and passing through said axis, said contact members extending in a direction which is perpendicular to the axis and upon both sides of the axis. As here shown each of the contacts 29, 30 and 31 comprises two telescoping tube sections closed at their outer ends and together enclosing a coil spring 32 which presses the tube sections apart. One of these tube sections which is received by the other section is desirably provided at its inner end with spring fingers 33 which may be sprung outwardly slightly to be compressed by the other tube section and thus by friction to maintain the tube sections in assembly. Under the action of the spring 32 the tube sections are pressed radially apart and each end of the contacts 29, 30 and 31 engage complementary contacts circumferentially disposed within the casing 1, the movable contacts 29, 30 and 31 providing current conducting bridges between the circumferentially disposed complemental contacts. One of these complementary contacts is desirably produced from an oblong piece of metal which is formed into the somewhat semi-circular plate 34 secured at each end to the insulating wall member 11 (Figure 6) and otherwise spaced from the metallic portions of the casing 1. The plate 34 is bent upon itself to produce a plurality of parallel grooves 35, 36, 37, 38, 39 and 40 disposed longitudinally of the axis of the hub 16. These grooves are desirably V-shape and receive with a snap action the V-shape terminations 41 of one end of the contacts 29, 30 and 31. One of these grooves, such as the groove 39, is not itself V-shape, but for the purpose presently pointed out, is advantageously filled with a block of insulation 42 in which the V-shape groove 43 is formed corresponding to the V-shape grooves of the plate. To prevent displacement of the insulating block 42 the groove 39 may have undercut walls and the block 42 may be similarly shaped, thus preventing outward movement of the block from the groove, and lateral movement of the block may be prevented by a boss 44 which enters a corresponding aperture in the bottom of the groove 39. The block 42 is desirably longer axially of the casing 1 than the plate 34 is wide so as to guard against the plate 34 contacting with the metallic walls of the casing 1. The plate 34 is secured to the wall member 11 by having the reduced portions 45 of metallic terminal members 46 and 47 passing through the wall member 11, pass also through the plate 34 and be spun thereover as at 48. Thus the plate 34 is mechanically and electrically connected with each of the terminals 46 and 47. An insulated wire 49 (Figure 7) electrically connects the terminal 46 with one side of the grounded battery 50, thus also electrically connecting the plate 34 with the battery.

Complementary contacts upon the opposite side of the axis of the hub 16 are here represented by the metallic terminal members 51, 52, 53, 54, 55 and 56, which have reduced portions 57 passed through the insulating wall member 11 and riveted upon the inner surface of said wall as at 58 flush with said wall to be engaged by the movable contact 30. The plate 34 and the contacts 51 to 56 inclusive are disposed in a plane which is perpendicular to the axis of rotation of the movable contacts 29, 30 and 31 and which passes through the contact 30. The movable contact 30 thus forms a current conducting bridge between the plate 34 and the stationary contacts 51, 53, 54, 55 and 56. The terminal 52, for reasons presently pointed out, is not a contact. The movable contacts 29, 30 and 31 desirably have somewhat dome-shaped ends 59 which slide smoothly over the wall member 11.

The movable contact 29 similarly forms a current conducting bridge between the plate 34 and a contact 60 which may be an arcuate metallic plate embedded in the wall member 11 to be flush with the wall and extending abreast of and upon one side of the terminal members 51 to 56 inclusive. The plate 60 is laterally extended as at 61 and through a perforation 62 in said extension the reduced portion 57 of the terminal member 52 passes, the portion 58 of the terminal 52 being clinched over the extension 61, thus electrically connecting the plate 60 with the terminal 52. The plate 60 may be mechanically secured to the wall member 11 by suitably directed end portions 63 which pass through the wall member and are clinched upon the outer side thereof.

The movable contact 31 provides a current conducting bridge between the plate 34 and another complementary contact here represented by the arcuate plate 64 which is embedded in the wall member 11 to be flush with the inner surface thereof similarly to the plate 60. The plate 64 has a lateral extension 65 and an aperture 66 therethrough by which the plate 64 is electrically connected with the terminal 53, the reduced portion 57 of the terminal passing through the aperture 66 and being clinched over the portion 65. The plate 64 also has a suitably directed portion 67 which passes through the wall member 11 similarly to the portions 63 of the plate 60. The extensions 63 of the plate 60 and the extension 67 of the plate 64 are clinched upon the outer surface of the wall member 11 as by the portions 68. The coil springs 32 enclosed within the movable contacts 29, 30 and 31 maintain the tube sections of these contacts pressed apart and into engagement with the foregoing complementary contacts.

When the contact carrier 24 is in the position shown in Figure 6, the V-shaped ends 41 of the movable contacts 29, 30 and 31 are seated in the V-shaped groove 43 of the insulating block 42 which occupies the groove 39 in the plate 34. Consequently, the movable contacts 29, 30 and 31 are insulated from the plate 34 and the current from the battery through the movable contacts is discontinued. This constitutes the "off" position of the switch.

When, however, the carrier 24 is rotated by means of the operating lever 17 to cause the movable contacts 29, 30 and 31 to have their V-shaped ends located in the groove 40 of the plate 34 a circuit is established through the grounded battery 50, conductor 49, terminal 46, plate 34, movable contact 30, terminal 51, which is diametrically opposite the groove 40, insulated wire 69a and through the grounded filaments of the parking lamps 69. At the same time a circuit is established through the grounded battery 50, plate 34, movable contact 29, arcuate plate 60, terminal 52, insulated wire 70 and through the grounded rear lamp 71. Also a circuit is established by means of the wire 70 through a grounded instrument lamp 71a. This constitutes one position of the switch for night use when the vehicle is not in motion.

When the carrier 24 is rotated to have the V-shaped ends of the movable contacts seated in the groove 38 of the plate 34 a circuit is established through the grounded battery 50, plate 34, movable contact 30, terminal 53, insulated wire 72, to the ignition system of the vehicle here symbolically indicated at 73. In this position of the carrier 24 the contact 29 engages an insulating insert 74 disposed in a depressed portion 75 of the plate 60 and thus there is no current passing to the rear lamp 71 and instrument lamp 71a. This constitutes the position of the switch suitable for day time driving.

When the contact carrier 24 is rotated to have the V-shaped ends of the contacts 29, 30 and 31 seated in the V-shaped groove 37 of the plate 34 a circuit is established through the grounded battery 50, plate 34, movable contact 30, terminal 54, insulated wire 76 and through the grounded filaments 77 of the driving lamps 78. The filaments 77 may constitute the bright driving lights of the lamps 78 as by being located in the focus of the driving lamps. At the same time another circuit is established through the grounded battery 50, plate 34, movable contact 29, plate 60, terminal 52, insulated wire 70 and through the grounded rear lamp 71 and grounded instrument lamp 71a. Also still another circuit is established through the plate 34, movable contact 31, plate 64, terminal 53, wire 72 and through the ignition system 73. Thus this constitutes the position of the switch for normal night driving.

When the carrier 24 is rotated to have the V-shaped terminals of the movable contacts seated in the groove 36 of the plate 34 a circuit is established through the grounded battery 50, plate 34, movable contact 30, terminal 55, insulated wire 79 and through the grounded filaments 80 of the driving lamps 78. The filaments 80 may constitute the intermediate driving lights of the lamps 78 as by being located above the focus of the driving lamps. At the same time a circuit is established through the plate 34, movable contact 29, plate 60, terminal 52, wire 70 and through the rear lamp 71 and instrument lamp 71a. Also still another circuit is established through the plate 34, movable contact 31, plate 64, wire 72 and through the ignition system 73 of the vehicle. This constitutes the position of the switch for night driving when the vehicle is passing another car, for example.

When the carrier is further rotated to have the V-shaped terminals of the movable contacts seated in the groove 35 of the plate 34 a circuit is established through the grounded battery 50, plate 34, movable contact 30, terminal 56, insulated wire 81 through the grounded reading lamp 82. At the same time a circuit is established through the plate 34, movable contact 29, plate 60 and wire 70 through the rear lamp 71 and instrument lamp 71a. Also as will now be clearly understood still another circuit is established through the movable contact 31, plate 64, terminal 53, wire 72 and through the ignition system 73 of the vehicle. This constitutes a selective position of the switch in which the parking and driving lights are extinguished.

An insulated wire 83 connects the terminal 47 with electromagnetic horn 83a and another wire 84 leads from the horn to a contact button 85 which may be located for example on the steering column of the vehicle (not shown). By means of a movable contact 86, the horn may be grounded, upon which a circuit is established through the grounded battery 50, wire 49, terminal 46, plate 34, terminal 47, wire 83 and through the horn 83a to energize the latter. Thus the horn may be energized in any position of the switching mechanism.

Means here shown for effecting the snap action of the switch is broadly claimed in my copending application, Ser. No. 584,444, filed January 2, 1932.

Obviously, the invention is not limited to the specific details of construction herein described for purposes of exemplification. Furthermore, it is not indispensable that all features of the invention be used conjointly as various combinations and sub-combinations may be advantageously employed.

Having described an embodiment of my invention, I claim:

1. In a switching mechanism the combination of a rotatable contact carrier, spring pressed contacts carried by said carrier arranged in a plane extending along the axis of rotation of the carrier and passing through said axis perpendicularly, said contacts extending diametrically on opposite sides of said axis, and complementary contacts circumferentially arranged about said axis and on each side thereof to be engaged by opposite ends of said contacts, one of said complementary contacts being in the form of an arcuate plate simultaneously engaged by all of said contacts carried by the contact carrier, said arcuate plate constituting a circuit continuing member for an electromagnetic horn.

2. The structure of claim 1 wherein the arcuate plate is connected with the battery and has an insulating insert simultaneously engageable by all of the contacts carried by the contact carrier to discontinue the circuit through said contacts.

3. The structure of claim 1 wherein one of the contacts carried by the contact carrier establishes a circuit through lighting means for the vehicle and another of said contacts simultaneously establishes a circuit through the ignition means.

4. The structure of claim 1 wherein the arcuate plate carries a plurality of V-shaped channels extending longitudinally of the axis of rotation of the contact carrier and the ends of the contacts carried by the contact carrier are V-shaped to seat in said grooves with a snap action.

5. In a switching mechanism, the combination of a casing having a circular central aperture, a contact carrier rotatable in said casing, an actuator having a hub portion keyed to said carrier and an integral portion extending through the opening in said casing providing an operating lever for the actuator, and resilient means for effecting rotation of the carrier and actuator by a snap action.

6. The structure of claim 5 wherein the hub has lateral continuations providing flanges within the casing for limiting movement of the actuator outwardly of the aperture, and wherein the continuations are laterally extended to provide fingers for engaging a stop on the interior of the casing to limit the rotation of the actuator.

7. In a switching mechanism, the combination with a metallic casing; of a rotatable insulating contact carrier; spring pressed contacts carried by said carrier arranged in a plane extending along the axis of rotation of the carrier and passing through said axis, said contacts being spring pressed radially of the axis; insulated complementary contacts carried by the casing, said complementary contacts being in the form of arcuate plates concentric with said axis; and an insulating insert in one of said plates to discontinue a circuit therethrough.

8. In a switching mechanism, the combination with a metallic casing; of a rotatable insulating contact carrier; spring pressed contacts carried by said carrier arranged in a plane extending along the axis of rotation of the carrier and passing through said axis, said contacts being spring pressed radially of the axis; insulated complementary contacts carried by the casing, said complementary contacts being in the form of arcuate plates concentric with said axis; an insulating insert in one of said plates engageable with one of the first mentioned contacts; a central aperture in the casing; a metallic actuator rotatable in said aperture and in driving engagement with the carrier; a stop on the wall of the casing; a finger on the actuator engageable with the stop to limit rotation of the parts; and resilient means for effecting a snap action of the carrier.

HARRY A. DOUGLAS.